US008082943B2

(12) United States Patent
Brenner et al.

(10) Patent No.: US 8,082,943 B2
(45) Date of Patent: Dec. 27, 2011

(54) VALVE APPARATUS

(75) Inventors: Jakob Brenner, Esslingen (DE); Grzegorz Bogdanowicz, Ostfildern (DE)

(73) Assignee: Festo AG & Co. KG, Esslingen (DE)

( * ) Notice: Subject to any disclaimer, the term of this patent is extended or adjusted under 35 U.S.C. 154(b) by 507 days.

(21) Appl. No.: 12/310,866

(22) PCT Filed: Oct. 30, 2007

(86) PCT No.: PCT/EP2007/009421

§ 371 (c)(1),
(2), (4) Date: Mar. 9, 2009

(87) PCT Pub. No.: WO2008/064755

PCT Pub. Date: Jun. 5, 2008

(65) Prior Publication Data

US 2009/0205724 A1 Aug. 20, 2009

(30) Foreign Application Priority Data

Nov. 28, 2006 (DE) ......................... 10 2006 056 089

(51) Int. Cl.
*F16K 11/24* (2006.01)

(52) U.S. Cl. ........................................ 137/271; 137/884

(58) Field of Classification Search .................. 137/269, 137/271, 884

See application file for complete search history.

(56) References Cited

U.S. PATENT DOCUMENTS

| | | | | |
|---|---|---|---|---|
| 3,213,883 | A * | 10/1965 | Carls | 137/884 |
| 6,408,868 | B2 * | 6/2002 | Rondreux et al. | 137/270 |
| 6,763,848 | B2 * | 7/2004 | Rondreux et al. | 137/269 |
| 6,807,981 | B2 * | 10/2004 | Miyazoe et al. | 137/269 |
| 7,591,280 | B2 * | 9/2009 | Narita et al. | 137/269 |
| RE41,299 | E * | 5/2010 | Atkin et al. | 137/315.01 |
| 2003/0029510 | A1 | 2/2003 | Miyazoe et al. | |

FOREIGN PATENT DOCUMENTS

| | | |
|---|---|---|
| DE | 2738027 | 3/1978 |
| DE | 4444024 | 6/1996 |
| DE | 29810091 | 1/1999 |
| DE | 10213397 | 10/2003 |
| DE | 202006008921 | 9/2006 |
| EP | 0584494 | 3/1994 |
| EP | 15274437 | 4/2005 |
| EP | 1637789 | 3/2006 |

* cited by examiner

*Primary Examiner* — John Fox
(74) *Attorney, Agent, or Firm* — Hoffmann & Baron, LLP

(57) ABSTRACT

A valve means (1) comprises a valve support (2) with internal valve support ducts (15). Several component mounting sites (12) are located on the valve support (2) to be individually fitted with control units (3), at least one special purpose control unit (3*b*) being present, which with an intermediate plate (24) simultaneously covers over several adjacently placed component mounting sites (12). At least one control valve (4) of the special purpose control unit (3*b*) is connected with the valve support ducts (15) opening at the covered component mounting sites (12) via an intermediate plate duct arrangement (28) running in the intermediate plate (24).

17 Claims, 4 Drawing Sheets

VALVE APPARATUS

This application claims priority based on an International Application filed under the Patent Cooperation Treaty, PCT/EP2007/009421, filed Oct. 30, 2007 and German Patent Application No. DE 102006056089.2, filed Nov. 28, 2006.

BACKGROUND OF THE INVENTION

The invention relates to a valve means comprising a valve support having a component mounting face divided up into several component mounting sites placed in sequence in a row direction and at which respectively several valve support ducts of a valve support duct arrangement extending through the valve support open and which are able to be fitted individually with control units having at least one control valve, respectively.

A valve means disclosed in the European patent publication EP 1 637 789 A1 of this type comprises a plate-like valve support which is fitted with several control units each mounted on a component mounting site specifically associated with them. The width of the individual control units is equal to the width of the individual component mounting sites. By way of valve support ducts, opening at the component mounting sites, of a valve support duct arrangement (extending in the valve support) a control valve of the associated control unit is supplied with fluid pressure medium, the control valve being seated on an intermediate plate or being able to be installed directly on the component mounting site. The use of an intermediate plate renders possible producing a specific influence on the fluid flowing between the valve support and the control valve, as for example a regulation of pressure.

The European patent publication EP 0 584 494 A1 describes the optional fitting of a valve means with adapter plates in order to jointly install control valves of different design series on the same valve support.

The German patent publication DE 44 44 024 A1 discloses a valve means in which control units, which do not have any intermediate plates, are directly mounted on individual component mounting sites of a valve support. A comparable arrangement is disclosed by the German patent publication DE 298 10 091 U1, in which case a further possibility is mentioned of combining control valves of different width on a valve support.

SUMMARY OF THE INVENTION

Owing to the possibility of fitting a valve support with control units having an intermediate plate there is the possibility of a substantial range of variation for the use of the valve means. In many cases it is not sufficient to satisfy the specific requirements of user. Accordingly one object of the present invention is to create a valve means of the type initially mentioned, which renders possible a greater degree of variation of the fluid circuitry for the sake of expanding the field of application of the valve means in a simple manner.

In order to perform this task the component mounting face of the valve support is fitted with at least one special purpose control unit having an intermediate plate which with its bottom face is mounted on the component mounting face and which owing to having a suitable width covers over several adjacently placed component mounting sites, such intermediate plate having extending through it an intermediate plate duct arrangement, which bears at least one control valve connected with the intermediate plate duct arrangement.

While standard control units in each case only occupy one component mounting site, the intermediate plate of the special purpose control unit reaches over at least two contiguous component mounting sites. Accordingly there is a comparatively large overall width of the intermediate plate available for the internal intermediate plate duct arrangement which renders possible the provision of complex fluid circuits as well, all in conjunction with a low overall height, if required, of the intermediate plate. There is the particularly advantageous possibility of including one or more of the valve support ducts, which open at the several covered component mounting sites, in one fluid circuit which is defined by the intermediate plate duct arrangement and the at least one control valve arranged on the intermediate plate, of the special purpose control unit.

An arrangement has turned out to be particularly advantageous in which the dimensions of the intermediate plate of the special purpose control unit are so chosen that it covers over exactly two adjacently placed component mounting sites.

If the component mounting face has a correspondingly large number of component mounting sites, several special purpose control units may be simultaneously mounted thereon or a mixed selection of at least one special purpose control unit and at least one conventional control unit covering only one component mounting site can be mounted. Accordingly there is a modular design with many different possibilities of configuration of the valve means and accordingly a high degree of possible variations as regards applications.

Further advantageous developments of the invention are defined in the dependent claims.

As a particularly appropriate arrangement the valve means is such that the intermediate plate duct arrangement of the at least one special purpose control unit comprises at least one connecting duct, connecting together the control valves belonging to the special purpose control unit. In addition or as an alternative at least one connecting duct of the intermediate plate duct arrangement may connect together at least two valve support ducts, which open at covered different component mounting sites.

The use of at least one such connecting duct opens up for example the possibility of so placing two control valves in circuit with each other that a connected individual working duct of the valve support duct arrangement is only supplied with pressure medium when both control valves are operated simultaneously. Accordingly a safety circuit, suitable for the control of presses, may be contrived extremely simply and compactly.

There is moreover the possibility of providing a connecting duct with such a configuration that it communicates simultaneously with working ducts of the valve support duct arrangement opening at several component mounting sites. This renders possible a simultaneous supply of fluid to several loads, or when the working ducts are connected together, the supply of one load at an increased rate of flow.

More specially there is also the possibility of providing the intermediate plate with at least one vacuum producing means. Given a suitable design of the intermediate plate duct arrangement negative pressure produced by a single vacuum generator can be applied simultaneously to several working ducts and tapped. It is just as possible, using a single control valve, to simultaneously operate several vacuum producing means. The vacuum producing means will more particularly comprise a suction nozzle operating on the ejector principle.

BRIEF DESCRIPTION OF THE DRAWINGS

In the following the invention will be explained with reference to the accompanying drawings in detail.

DETAILED DESCRIPTION OF THE PREFERRED EMBODIMENTS

Figure 1:
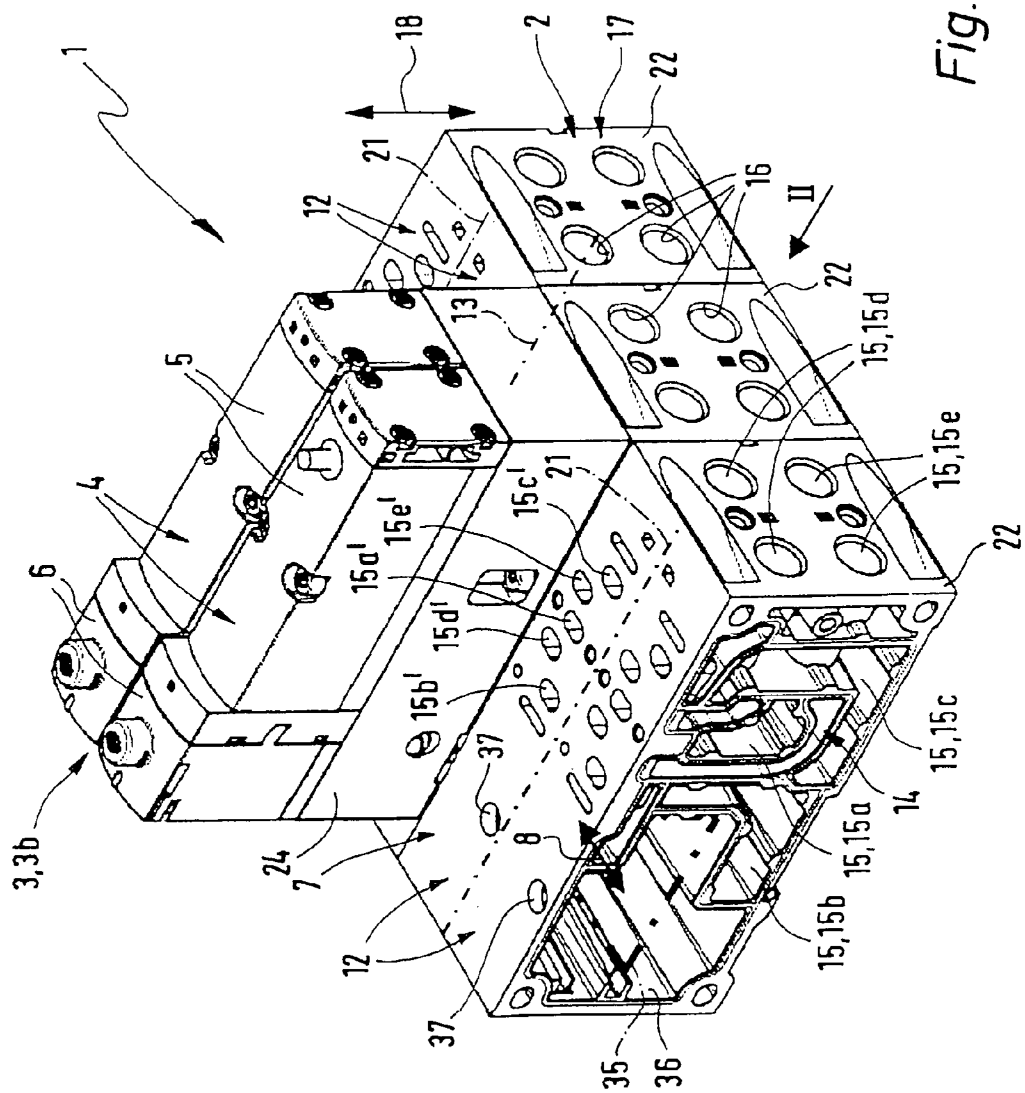
FIG. 1 is a perspective showing of a preferred first working example of the valve means in accordance with the invention in a state fitted with only one special purpose control unit, the remaining component mounting sites being illustrated unoccupied.

The valve means generally referenced 1 is designed as a valve cluster and includes a valve support 2 which simultaneously may be fitted with several control units 3, which each possess at least one preferably electrically actuated control valve 4.

The control valves 4 comprise a principal valve part 5 having a moving valve member not illustrated in detail and at least one drive part 6 associated with it. The drive part 6 can be electrically activated and sets the desired switching state of the principal valve part 5. The drive part 6 is more especially an electromagnet in combination with a directly controlled control valve 4 and a pilot valve 4 is an electrically actuated pilot valve, more especially a solenoid valve. The drive part 6 may comprise several electromagnets and/or pilot valves.

Figure 2:
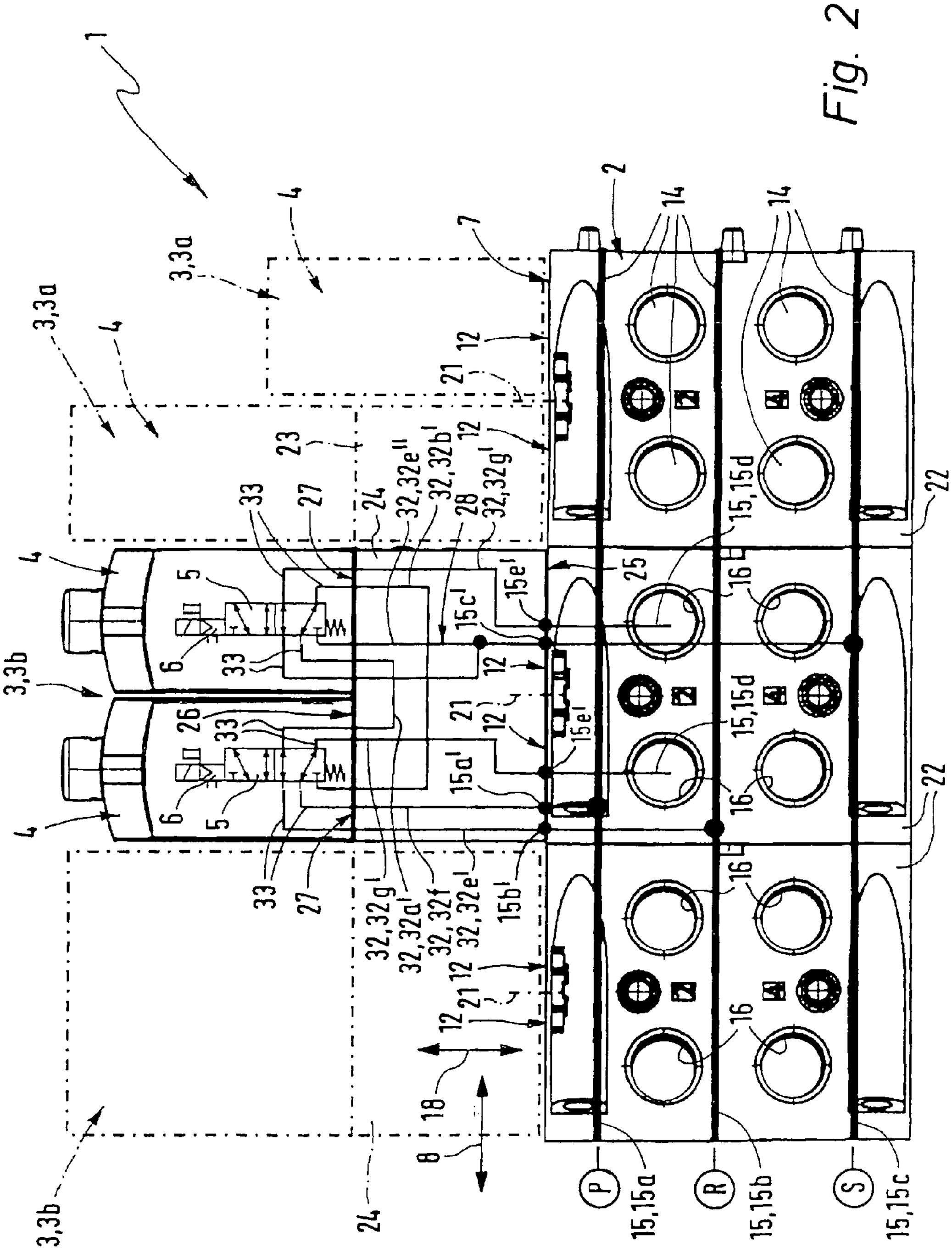
FIG. 2 shows the valve means of FIG. 1 in an end-on view looking in the direction of the arrow II, further optionally installed control units also being depicted.
Figure 4:
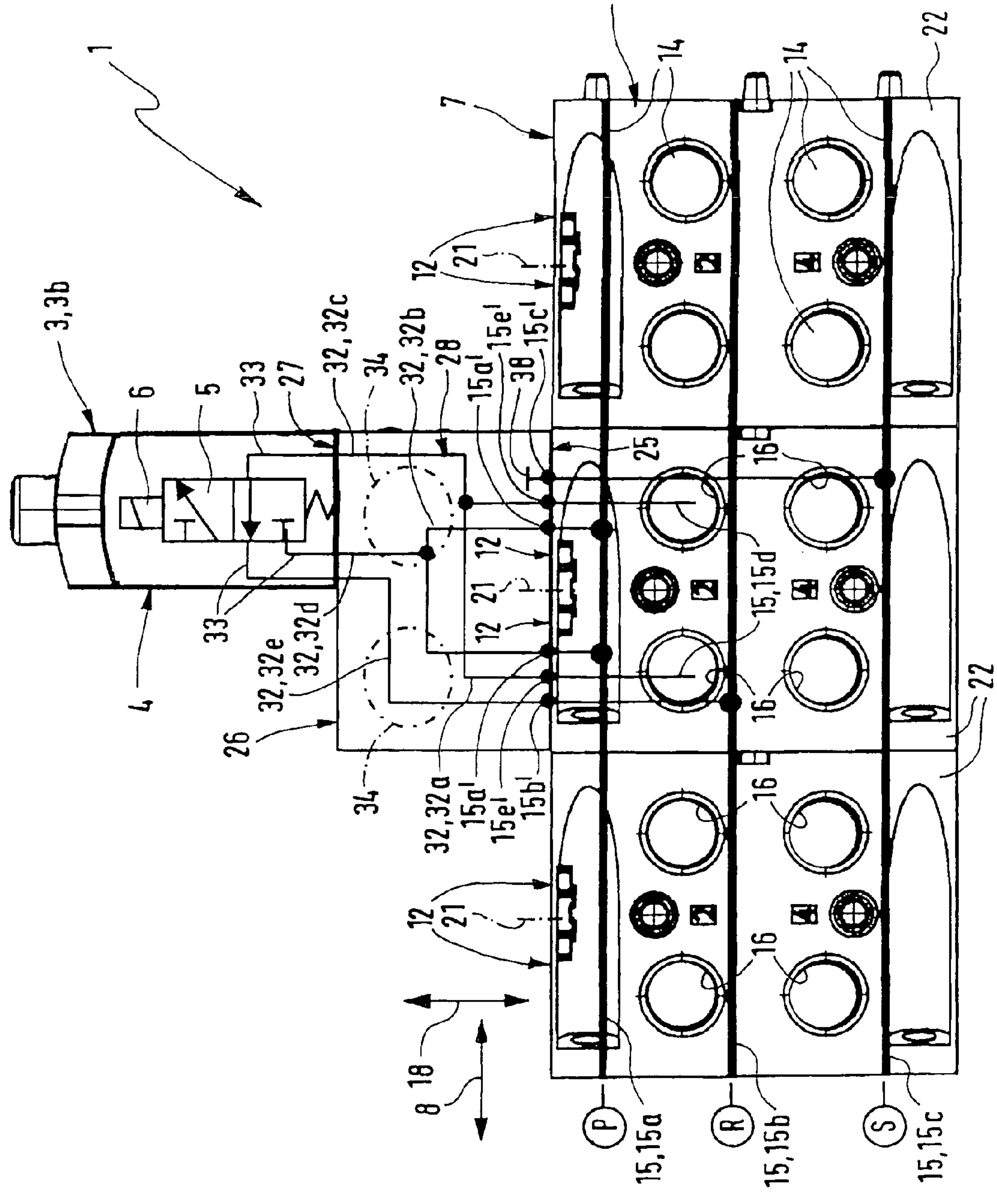
FIG. 4 is a terminal view of the valve means of FIG. 3 looking in the direction of the arrow IV.

In FIGS. 2 and 4 the control valves 4 have the respective circuit symbol. This will serve to make it clear that in the case of the control valves 4 it may be a question for example of 3/2 way valves as in FIG. 4 or of 5/2 way valves as in the case of FIG. 2.

The outer face of the valve support 2 constitutes a preferably flat component mounting face 7, on which the control units 3 may be secured, preferably detachably. The component mounting face 7 is here divided up into several component mounting sites 12 lined up in a row direction 8 indicated by a double arrow, which are able to be employed to mount the control units 3. The row direction 8 in particular coincides with the longitudinal axis of the valve support 2.

The control units 3 preferably possess an elongated shape. Their longitudinal axis 13 runs perpendicularly to the row direction 8. The same applies furthermore for the respective elongated component mounting sites 12.

The valve support 2 has extending through it a valve support duct arrangement generally referenced 14 and composed of a system of valve support ducts 15. Among the valve support ducts 15 there is preferably at least one supply duct 15*a* able to be joined to an external pressure source P and at least one discharge duct 15*b* and 15*c* able to be connected with a pressure sink or absorber R and S, in particular the atmosphere. In the working example two mutually parallel discharge ducts 15*b* and 15*c* are present in order more especially to render possible optimum removal of fluid more particularly in the case of control valves 4 with a four or five way functionality. The supply duct 15*a* and the discharge ducts 15*b* and 15*c* extend in the interior of the valve support 2 in the row direction 8, each of them opening at a component mounting site 12. The corresponding duct openings are denoted reference numerals 15*a*', 15*b*' and 15*c*'.

The valve support ducts 15 furthermore include working ducts 15*d* and 15*e*. While the supply ducts 15*a*, 15*b* and 15*c* are provided for all component mounting sites 12 in common and it is therefore possible to speak of a common supply duct 15*a* and of common discharge ducts 15*b* and 15*c*, the working ducts 15*d* and 15*e* are in the form of individual ducts, there opening at each component mounting site 12 an individual first working duct 15*d* and more particularly also an individual second working duct 15*e*. The respective duct openings are referenced 15*d*' and 15*e*'. These individual working ducts 15*d* and 15*e* are not connected together within the valve support 2.

At their ends remote from the component mounting sites 12 the working ducts 15*d* and 15*e* respectively open (via a respective load connection port 16, rendering possible the connection of a load) at an outer face, which is separate from the component mounting face 7, of the valve support 2, such outer working face being in the following termed the load connection face 17. The load connection ports 16 are provided with connection means, not illustrated in detail, with which respectively a fluid line leading to the load can be connected, more particularly detachably. The connection means are for example screw threads or plug connection means.

The load connection face 17 is best arranged perpendicularly to the component mounting face 7. The load connection ports 16 of the working ducts 15*d* and 15*e* leading to the respectively same component mounting site 12 are best arranged in the height direction 18 indicated by double arrow of the valve means 1 above each other, the height direction 18 being perpendicular to the component mounting face 7.

The duct ports 15*a*' through 15*e*' constitute patterns of opening which are identical at all component mounting sites 12. The patterns of the ports may more especially be according to the standard ISO 5599-2 or ISO 15407.

Instead of two individual working ducts 15*d* and 15*e* if appropriate only one individual working duct may be provided for the individual component mounting sites 12.

For simplification the various ducts in FIGS. 2 and 4 are partially only indicated diagrammatically by single lines.

While the valve support 2 in principle may be integral, in the working examples it is composed of several valve support segments 22 lined up in the row direction 8 with sealing means between them. They may, in accordance with the desired overall length of the valve support 2, be combined in a varying number.

In the working embodiments each valve support segment 22 defines two component mounting sites 12 placed directly adjacent to each other in the row direction 8. In particular they uniformly merge with each other.

For the sake of simplification in the drawing the transitional zones between adjacent component mounting sites 12 are marked by dot-dash lines 23.

Each component mounting site 12 is in principle suitable for the individual fitting with a specific control unit 3 exclusive to it which for the sake of making a better distinction will be termed a standard control unit 3*a* in the following. The width as measured in the row direction 8 of each standard control unit 3*a* does not exceed the correspondingly measured width of the associated component mounting site 12, there being essentially the same width thereof. In the case of the working example illustrated accordingly in principle on each valve support segment 22 two standard control units 3*a* may be simultaneously placed.

The standard control units 3*a* possess internal ducts, which are not illustrated in detail, opening toward the base face facing the component mounting site 12 so that in the mounted state there is a correctly aligned connection with the valve support ducts 15 opening at the component mounting site 12.

To take the simplest case the standard control unit 3*a* may consist only of one control valve 4. As shown in FIG. 2 this applies for the standard control unit 3*a* depicted on the far left. In the case of a further modification of the standard control unit 3*a*, shown in FIG. 2 as the second from the right, the control valve 4 is seated on an intermediate plate 23 belonging to the standard control unit 3*a* and is mounted by it at the component mounting site 2. Between the control valve 4 and the base face opposite to it fluid ducts, not illustrated, extend in the intermediate plate 23, such ducts communicating with the duct openings 15*a*' through 15*e*'. On its passage through the intermediate plate 23 the fluid may be subjected to any desired action, as for example regulation of pressure or choking, for which purpose the intermediate plate 23 may be provided with fluid operating means, not illustrated in detail, of any suitable type.

At least one control unit 3 of the valve means 1, referred to in the following as the special purpose control unit, differs in width from the grid pitch of the component mounting sites 12 and accordingly also from that of the standard control units 3*a*, its width being more particularly an integral multiple of the width. as measured of the row direction 8, of a component mounting site 12. In this respect it is more especially advantageous to have the double width of a component mounting site 12 as in the working examples.

On the basis on the one hand of the FIGS. 1 and 2 and on the other hand of FIGS. 3 and 4 two different types of special purpose control units 3*b* will be explained, the descriptions, in the absence of any indication to the contrary, always applying for both embodiments.

At this point it is to be observed that it is quite possible for one and the same component mounting face 7 of the valve means to simultaneously mount different types of special purpose control units 3*b*. Furthermore it is possible to fit the entire component mounting face 7 exclusively with special purpose control units 3*b* or however to have a mixed assortment including any desired number of special purpose control units 3*b* and standard control units 31. This renders possible a variable configuration of the valve means 1 while taking into account the respective conditions of application.

The special purpose control unit 3*b* comprises at least one intermediate plate 24 bearing a control valve 4. When in the following the term intermediate plate is employed, this will mean the intermediate plate of a special purpose control unit 3*b*. If a reference to the intermediate plate 23 of a standard control unit 31 is intended, this will be explicitly noted.

The intermediate plate 24 is mounted on the component mounting face 7 with the bottom side 25 to the fore, its suitably large width meaning that it covers two directly adjacent component mounting sites 12 of the component mounting face 7. Its width as measured in the row direction 8 is equal to twice the width of a component mounting site 12, it having to be mentioned that in the working example all component mounting sites 12 possess the same dimensions. Preferably each component mounting site furthermore has a rectangular outline.

The intermediate plate 24 may, given a suitable width, also cover more than two component mounting sites 12.

At least one control valve 4 could in principle be arranged terminally on the preferably parallelopiped-like intermediate plate 24. However illustrated geometry is preferred with at least one control valve 4 installed on the top side 26, opposite to the valve support 2, of the intermediate plate 24. In this respect it is possible to speak of a level concatenation.

In the working embodiment illustrated in FIGS. 1 and 2 the intermediate plate 24 is provided with two control valves 4. They are seated adjacent to each other in the row direction 8 on two correspondingly adjacent valve mounting sites 27 of the intermediate plate 24.

Figure 3:
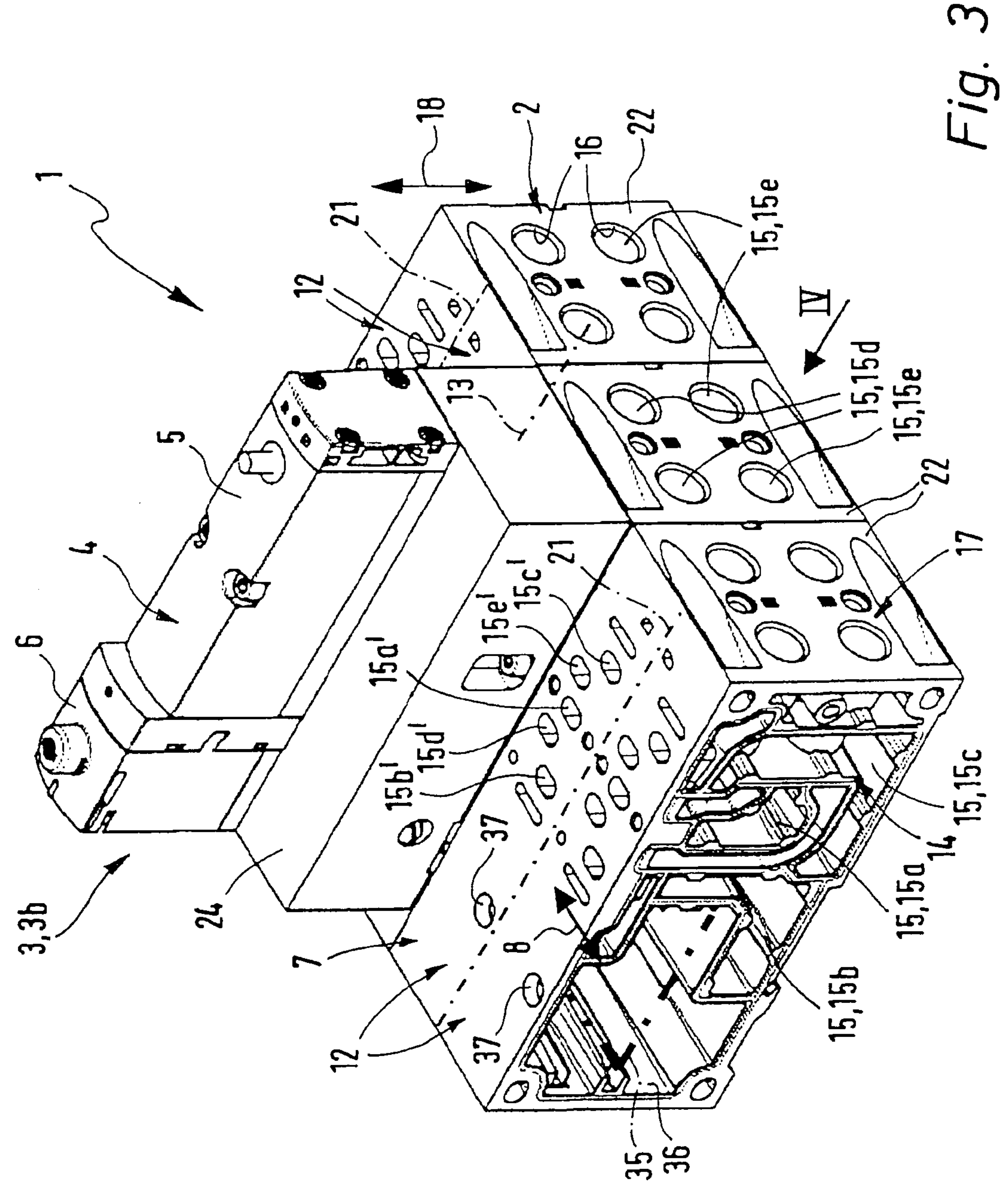
FIG. 3 shows in perspective a further preferred working embodiment of the valve means in a manner of representation similar to that of FIG. 1, albeit with a different type of special purpose control unit.

In the working embodiment illustrated in FIGS. 3 and 4 the special purpose control unit 3*b* is provided with on the top side 26 of its intermediate plate 24 only one means mounting site, such site 27 mounting the single control valve 4 of this special purpose control unit 3*b*.

The intermediate plate 24 of every special purpose control unit 3*b* has an intermediate plate duct arrangement, generally referenced 28, extending through it, which is composed of several suitably directed intermediate plate ducts 32. At some of the intermediate plate ducts 32 the intermediate plate duct arrangement 28 so opens at the bottom side 25 of the intermediate plate 24 with such a distribution that different duct connections are produced with valve support ducts 12 opening at the covered component mounting sites 12.

It is in this manner that a fluid connection can be produced between the valve support ducts 15 and the intermediate plate ducts 32 at each of the component mounting sites 12 covered by the intermediate plate 24. The linking of the ducts is therefore not limited to the width of a single component mounting site 12 and may extend over a greater width.

At least some of the intermediate plate ducts 32 open (as well) at one valve mounting site 27 and are connected fluidwise with valve ducts 33 of the control valve 4 respectively mounted here. The valve ducts 33 therefore open at the bottom side, facing the intermediate plate 24, of the respective control valve 4 so that there is an aligned transition with the openings, present on the valve mounting site 27, of the intermediate plate ducts 32.

In accordance with the selected configuration of the intermediate plate duct arrangement 28 and the number of control valves 4 present it is possible to realize, within a special purpose control unit 3*b*, a fluid circuit conceived for a particular application. Since such circuit may include valve support ducts 15 opening at several component mounting sites 12, it is possible to realize extremely complex and sophisticated circuit in a small space without additional external line connections.

For instance the special purpose control unit 3*b* of the working example in FIGS. 3 and 4 is characterized by the intermediate plate duct arrangement 28 having two intermediate plate ducts 32, which are respectively in the form of the connection ducts 32*a* and 32*b*, so opening at different positions on the bottom side 25 that such duct connects two valve support ducts 15 opening at different parts of the covered component mounting sites 12.

A first one (32*a*) of these two connecting ducts more particularly communicates with two first working ducts 15*d* opening at different component mounting sites 12 and is furthermore so connected via a further intermediate plate duct 32*c* with the single control valve 4 that, in a suitable position of switching, it can be supplied with pressure medium from the common supply duct 15*a*. Accordingly there is the possibility of supplying a load connected with the load connection openings 16 of both first working ducts 15*d* at a higher rate of flow or however of supplying pressure medium to different loads simultaneously and without a time lag.

More particularly when a relatively high fluid rate is desired, a second connection duct 32*b* may so open at the bottom side 25 that in both cases it communicates with the supply duct 15*a*. A further intermediate plate duct 32*d* joins the second connection duct 32*b* with the control valve 4.

In the open position, not illustrated, of the control valve 4 pressure medium is supplied from the supply duct 15*a* via the second connecting duct 32*d* and the following further intermediate plate duct 32*d* into the further intermediate plate duct 32*c*, whence it flows via the first connecting duct 32*a* into the two working ducts 15*d*.

An intermediate plate duct 32 designed as a return duct 32*e* extends between the valve mounting site 27 and the bottom side 25 and joins the control valve 4 with an outlet duct 15*b*. It is in this manner that the return of fluid from the respectively connected load can take place, when the control valve 4 assumes the closed position indicated.

Dependent on the particular application it would be possible in this manner to also do without the first or the second connecting duct 32*a* and 32*b*.

If the intermediate plate 24 has at least one vacuum producing means 34, which is supplied with compressed air via the control valve 4, it is possible to tap negative pressure at a suitably connected first and/or second working duct 15*b* and 15*e*. By a suitable modification of the course of the first connecting duct 12*a* it is possible for two working ducts 15*d* to be simultaneously connected with one and the same vacuum producing means 34.

The vacuum producing 34 more particularly operates in accordance with the ejector principle and comprises a suction nozzle, which produces a negative pressure, when compressed air is flowing through it.

In any case it is possible in this fashion to control the supply with negative pressure of working ducts using only a single control valve 4 of the special purpose control unit 3*b*, such working ducts extending from different component mounting sites 12.

A particularly satisfactory performance is achieved if two vacuum producing means 34 are simultaneously operated by way of a single control valve 4, a supply of negative pressure being possible simultaneously via two component mounting sites 12.

In the case of the working example of FIGS. 1 and 2 two connecting ducts 32*a*' and 32*b*' extend within the intermediate plate 24, which respectively open at one end and at the other end at the one valve mounting site 27 and at the other valve mounting site 27 and accordingly connect both control valves 4 with one another in each case. A return duct 32*e*' of the intermediate plate duct arrangement 28 joins one of the control valves 4 with a common return duct 15*b* in the valve support 2. Via a further return duct 32*e*" two ports of the other control valve 4 are also connected with a common return duct 15*c*. An actuating duct 32*f* connects the one control valve 4 with the common supply duct 15*a*. Finally two working ducts 15*d* belonging to different component mounting sites 12, of the valve support 2 are connected independently of each other via a through duct 32*g*', extending through the intermediate plate 24, with one respective one of the two control valves 4.

Accordingly it is possible to realize a security circuit particularly employed for presses, which only supplies the one working duct 15*d* with pressure medium, when both working control valves 4 are activated. Thus uncontrolled strokes of a press or some other machine may be avoided.

The circuit described here may admittedly be employed in a particularly advantageous manner in conjunction with the special purpose control units 3*b*. However the explanation of such circuit is to be comprehended as one possible example and it would be quite possible for other types of valves to be realized.

Since the control valves 4 are preferably of the electrically operated type transmission of the electrical control signals for it by means of an electrical signal transmission means 35 extending inside the valve support 2 is recommended. The same is only diagrammatically illustrated in the drawings and it extends more particularly in a signal transmission duct 36 in the row direction 8 in the valve support 2. At each component mounting site 12 an electrical interface is provided joined with the signal transmission means 35, such interface being joined via the electrical conductor extending through the attached intermediate plate 23 and 24 with the drive part 6, borne by the intermediate plate 23 and 24 of the at least one control valve 4. In the case of a standard control unit 3*a* without an intermediate plate 23 the drive part 6 may be directly connected with the electrical interface. At 37 apertures, provided adjacent to the component mounting sites 12, in the valve support 2 are indicated through which the electrical connection between the signal transmission means 35 and the associated control unit 3 may take place.

The electrical control signals could also, in a manner different to the working example, be supplied without using the valve support 2, f. i. via separate cables.

A valve means in accordance with the example renders possible a modular design. The electrical connections, like the fluid ports may be via the valve of the valve support 2. Within a special purpose control unit 3*b* virtually at least two component mounting sites 12, which are otherwise only able to be employed for individual fitting with standard control units 3*a*, are collected together without having to resort external flexible line connections. Apart from the special purpose control unit 3*b* the valve means may be conventional in design and in particular it does not require modifications of any standard control units 3*a* employed.

It is readily possible for at least two load port openings 16 to be connected together in order to obtain an enhanced rate of flow. It is to be noted finally that in particular in the case of a configuration with only one control valve 4 a sensor means may be accommodated adjacent to it in a compact fashion, which monitors the operation of the control valve 4 and/or which, if it is fitted with a pressure sensor or pressure switch, can perform pressure monitoring.

The intermediate plate duct arrangement 28 does not have to communicate with all valve support ducts 15 opening at the component mounting sites 12 covered by the intermediate plate 24 of the special purpose control unit 3*b*. The openings of valve support ducts 15 which are not required may be simply covered over by the intermediate plate 24 in a sealing manner, as is indicated in FIG. 4 at 38. For the sealing effect it is more particularly possible to employ a seal (not illustrated) placed between the intermediate plate 24 unit component mounting face 7, such seal being responsible for a leak-free transfer between the valve support ducts 15 communicating with each other and the intermediate plate ducts 32. This seal, which is more specially plate-like and/or molded on the bottom side 25, is not depicted in the drawing.

The invention claimed is:

1. A valve means comprising a valve support having a component mounting face divided up into several component mounting sites placed in sequence in a row direction and at which respectively several valve support ducts of a valve support duct arrangement extending through the valve support open and which are able to be fitted individually with control units respectively having at least one control valve wherein the component mounting face is equipped with at least one special purpose control unit having an intermediate plate which with its bottom face is mounted on the component mounting face and thereby owing to a suitable width covers over several directly adjacent component mounting sites, such intermediate plate having extending through it an intermediate plate duct arrangement which is connected with the valve support duct arrangement at the component mounting sites covered by the intermediate plate, said intermediate plate bearing at least one control valve connected with the intermediate plate duct arrangement.

2. The valve means in accordance with claim 1, wherein the intermediate plate duct arrangement comprises at least one connecting duct connecting at least two control valves of the special purpose control unit with one another.

3. The valve means in accordance with claim 1, wherein the intermediate plate duct arrangement comprises at least one connecting duct connecting with each other at least two valve support ducts which are opening at different component mounting sites.

4. The valve means in accordance with claim 1, wherein, at each of the component mounting sites covered over the intermediate plate, there opens an individual working duct able to be joined with a load, of the valve support duct arrangement.

5. The valve means in accordance with claim 4, wherein a connecting duct of the intermediate plate joins at least two working ducts with each other, which open at different covered component mounting sites.

6. The valve means in accordance with claim 1, wherein there opens at each component mounting site at least one individual working duct of the valve support duct arrangement, such working duct opening at the other end, via a load connection port opening, which renders possible the connection of a load, to an outer face arranged clear of the component mounting face, of the valve support.

7. The valve means in accordance with claim 1, wherein a valve support duct is designed as a common supply duct serving for the common fluid supply of all component mounting sites and opening at all component mounting sites.

8. The valve means in accordance with claim 7, wherein a connecting duct of the intermediate plate is connected at at least two different of the covered component mounting sites with the common supply duct.

9. The valve means in accordance with claim 1, wherein the intermediate plate is fitted with only one or with two control valves.

10. The valve means in accordance with claim 9, wherein the at least one connecting duct of the intermediate plate duct arrangement connects two control valves.

11. The valve means in accordance with claim 1, wherein the at least one control valve is arranged at the top side, opposite to the valve support of the intermediate plate.

12. The valve means in accordance with claim 1, wherein the intermediate plate covers over exactly two adjacently placed component mounting sites.

13. The valve means in accordance with claim 1, wherein several special purpose control units are arranged on the component mounting face.

14. The valve means in accordance with claim 1, wherein, on the component mounting face, there are simultaneously arranged at least one special purpose control unit and at least one control unit covering only one component mounting face.

15. The valve means in accordance with claim 1, wherein the intermediate plate is provided with at least one vacuum producing means able to be controlled by a control valve borne on the intermediate plate.

16. The valve means in accordance with claim 1, wherein the at least one control valve is of the electrically operated type.

17. The valve means in accordance with claim 1, wherein the valve support is made up of several valve support segments collected together in the row direction, which respectively define in each case at least one of the component mounting sites.

* * * * *